B. WHITNEY,

Grinding-Mill.

No. 8,098. Reissued Feb. 19, 1878.

Witnesses:

J. W. Case

Frank H. Pelouze

Inventor:

Bennet Whitney by his Atty.

Wm. F. Rowe

N. PETERS, PHOTO-LITHOGRAPHER, WASHINGTON, D. C.

UNITED STATES PATENT OFFICE.

BENNET WHITNEY, OF RAHWAY, NEW JERSEY.

IMPROVEMENT IN GRINDING-MILLS.

Specification forming part of Letters Patent No. 83,574, dated October 27, 1868; Reissue No. 8,098, dated February 19, 1878; application filed November 7, 1877.

DIVISION B.

*To all whom it may concern:*

Be it known that I, BENNET WHITNEY, of Rahway, in the county of Union and State of New Jersey, have invented certain new and useful Improvements in Grist-Mills, of which the following is a specification:

The object of this invention is to so construct a grist-mill that the upper stone will be allowed to swing in either direction, and can, at the same time, be adjusted up and down; that the whole mechanism can be easily taken apart without disturbing the bottom of the curb; and that the hopper and its shoe can be arranged on either side of the mill, as may be desired.

The invention consists, first, in hanging the upper stone, by means of two trunnions, in two bars, which are up and down adjustable on a plate, which is also up and down adjustable, by a nut working on a fixed vertical screw, and which plate can swing somewhat on that screw. The upper stone is thereby made vertically adjustable as well as swinging.

The invention consists, second, in suspending the shoe, by means of straps, from bars which are reversible on the frame of the mill, and in supporting the hopper on the same bars, so that the shoe and hopper may be arranged on either side of the machine.

Figure 1:
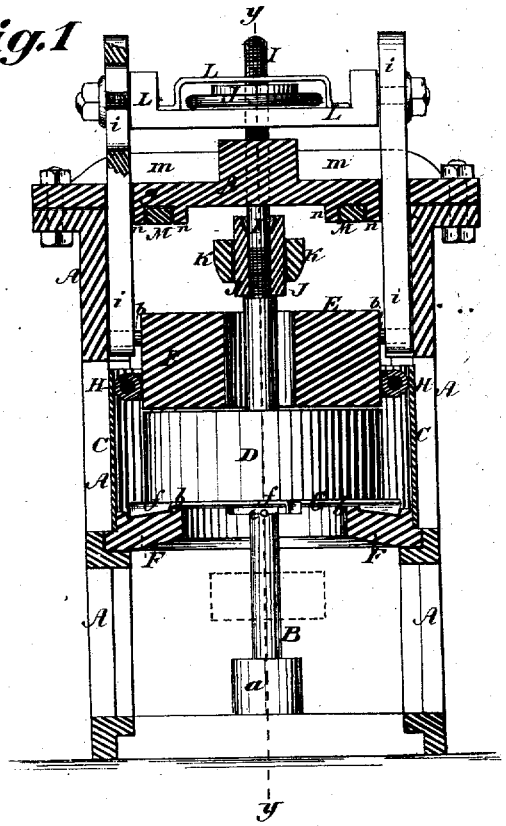
Figure 2:
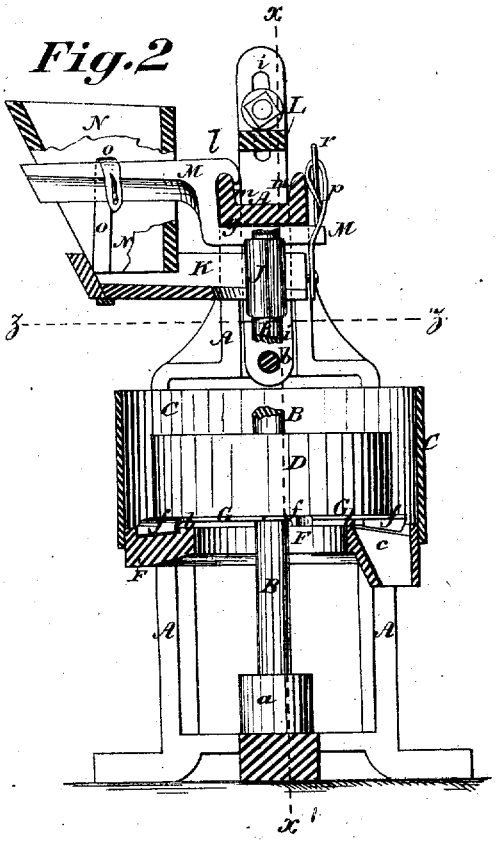
Figure 3:
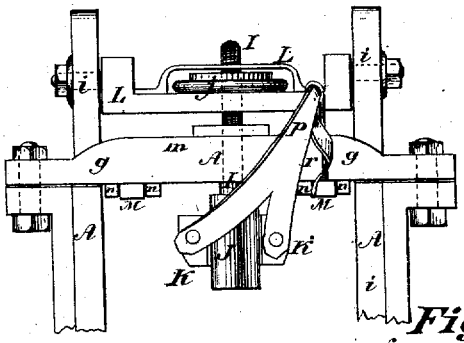
Figure 5:
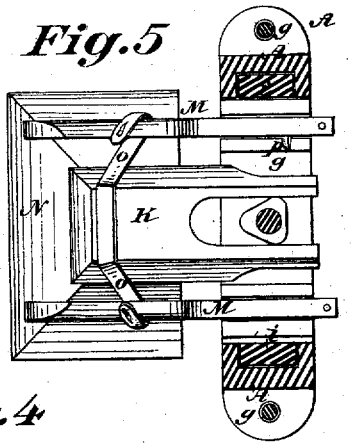
Figure 4:
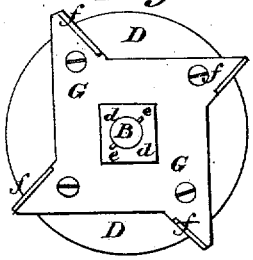

In the accompanying drawings, Figure 1 represents a vertical longitudinal section of my improved grist-mill, the plane of section being indicated by the line *x x*, Fig. 2. Fig. 2 is a vertical transverse section of the same, taken on the plane of the section *y y*, Fig. 1. Fig. 3 is a detail front view of the upper part of the same. Fig. 4 is an inverted plan view of the lower revolving stone. Fig. 5 is an inverted sectional horizontal view of the same, taken on the line *z z*, Fig. 2.

A in the drawings represents the frame of my improved mill, made of suitable material, form, and dimensions. The frame has a step, *a*, formed on it, for the support of the spindle B. C is the curb or cylindrical shell, supported on the frame A, and surrounding the lower stone D and the lower part, at least, of the upper stone E. F is an annular plate, fitted into or to the lower part of the curb, below the lower stone D, as shown in Figs. 1 and 2. It has an upward-projecting flange, *b*, at its inner edge, so as to form an annular trough for the reception of the meal. This trough has an aperture, *c*, through which the meal can be discharged.

The lower stone has a polygonal central aperture, which is filled by a metallic box, *d*, through the conical aperture of which the conical part of the spindle fits loose, so as to support the stone. From the spindle project two lugs or pins, *e e*, which fit into the notches provided in the box *d*. The stone D is, by means of the pins *e*, carried around with the spindle.

On the under side of the stone D are fitted projecting arms *f f*, which are either parts of a plate, G, or are otherwise attached to the stone, so as to project into the trough. These arms, as they revolve with the stone D, clear the trough and sweep the meal into the aperture *c*, to thereby convey it to a suitable receptacle.

I is a vertical pin, fitted stationary through a horizontal plate, *g*, of the frame above the upper end of the spindle. That part of the pin I which projects above the plate *g* is provided with a screw-thread; but its loose end is not.

On the upper end of the spindle B is secured a metal box, J, with a socket at its upper part for the reception of the lower end of the pin I. As the spindle is revolved its upper end is thus guided on the fixed pin I. The plate *g* is, at its ends, bolted to the uprights of the frame A, as in Fig. 1, so that it can be readily removed to allow the removal of the spindle and stones. The box J is of irregular, polygonal, or other cam shape, for the purpose of shaking the shoe K.

The upper stone E is provided with two projecting pins, H, which are in line with each other, and which are fitted into the lower ends of two vertical bars, *i i*, which, passing through the openings in plate *g*, are suspended from a horizontal bar or plate, L, as in Fig. 1.

The bars *i* are slotted and bolted to the ends of L, so as to be vertically adjustable thereon. The bar L has a horizontal slot, into which a nut, *j*, is put, that works on the screw I, the body of the bar L being also fitted around the screw I, but so that it can swing thereon, the aperture through which the screw fits being large enough to allow such swinging motion.

By turning the nut *j* the bar L and its appendages *i h* E will be up and down adjusted.

The stone E can also be raised and lowered by adjusting the bars *i* on L. The stone E can swing on the axis of the pins *h*, and also, with its frame *i* L, on the pin I.

The space between the upper stone and casing may be packed in a suitable manner, as fully described in the specification of Division A of the reissue application belonging to this original patent.

M M are two Z-shaped bars, each provided with a hook, *l*, at the junction of the upper horizontal with the vertical arm, as in Fig. 2. Each of these bars is hung upon the plate *g*, on the edge of which are upright ribs *m m* to receive the hooks. The lower horizontal arm of each bar M rests under the plate *g*, between two ribs, *n n*, or in a groove formed on the under side of the same. One end of the shoe K is, by means of the strap *o o*, suspended from the upper arms of the bars M, as in Figs. 1 and 5, while the other end is, by means of a forked strap, *p*, Fig. 3, suspended from a pin, *r*, that projects from one of the bars M. The pin *r* is removable. The strap *p* is drawn through an eye formed on the pin *r*, and is then wound around the said pin, and finally clamped between the bars M on a rib, *n*, as in Figs. 3 and 5.

By loosening the strap *p* the height of the shoe, or, rather, its degree of inclination, can be regulated. The shoe is slotted, grooved, or forked, as in Fig. 5, and fits around both sides of the cam J, so as to be oscillated by the same when the spindle B is rotated. The hopper N is also supported on the bars M, on the upper horizontal arms of the same.

As the bar can be reversed on the plate *g*, the shoe and hopper, which are or may be solely suspended from them, are also reversible, so that they may be arranged on either side of the machine, as may be most convenient.

I claim as new and desire to secure by Letters Patent—

1. In combination with the stone E, the pins *h*, slotted sliding bars *i*, slotted plate *g*, adjustable plate L, stationary screw I, and nut *j*, all operating as described, for adjustably suspending the stone E in the framing, substantially as described.

2. The reversible Z-shaped bars M, provided with hooks *l*, arranged to support the hopper and shoe, substantially as and for the purpose described.

BENNET WHITNEY.

Witnesses:
A. W. TALLMADGE,
E. FOWLER.